J. HOLST.
HAY FORK.
APPLICATION FILED MAY 12, 1913.
1,093,422.
Patented Apr. 14, 1914.
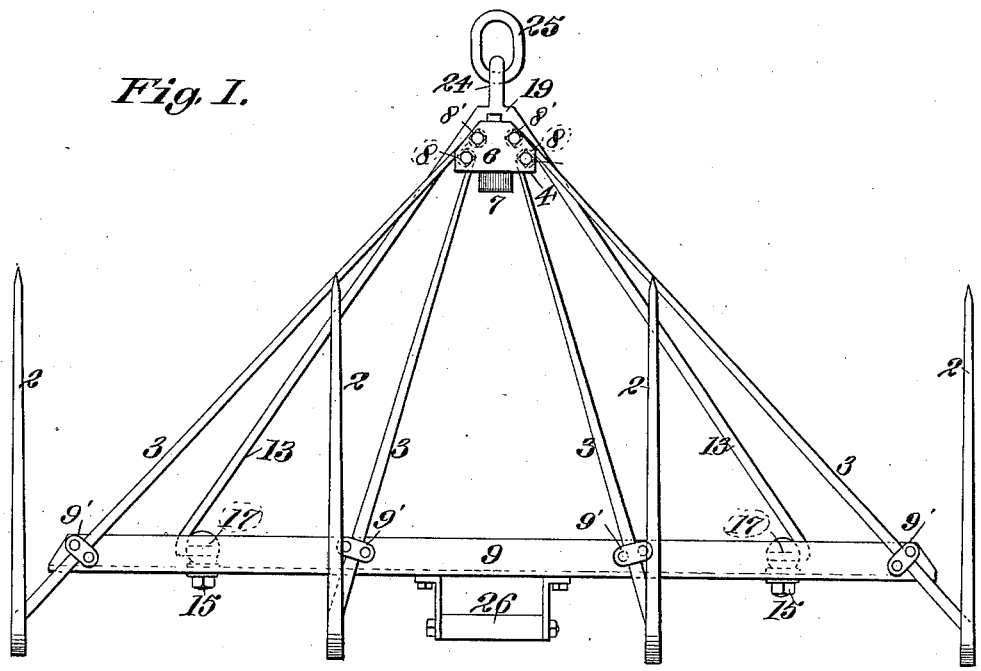
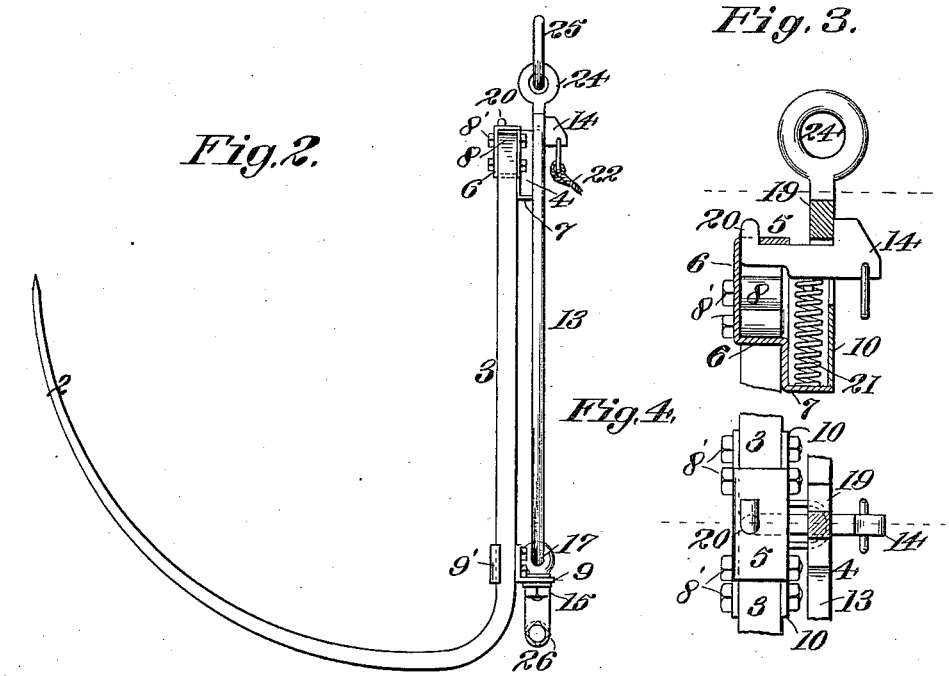
WITNESSES:
Charles Pickles
G. E. Maynard
INVENTOR
John Holst,
BY G. H. Strong.
ATTORNEY

UNITED STATES PATENT OFFICE.

JOHN HOLST, OF BERKELEY, CALIFORNIA, ASSIGNOR TO BYRON JACKSON IRON WORKS, OF BERKELEY, CALIFORNIA, A CORPORATION OF CALIFORNIA.

HAY-FORK.

1,093,422. Specification of Letters Patent. Patented Apr. 14, 1914.

Application filed May 12, 1913. Serial No. 766,918.

*To all whom it may concern:*

Be it known that I, JOHN HOLST, a citizen of the United States, residing at Berkeley, in the county of Alameda and State of California, have invented new and useful Improvements in Hay-Forks, of which the following is a specification.

This invention relates to hay forks and particularly to an all steel dumping fork.

It is an object of the present invention to provide an improved light-weight, strong derrick fork of simple construction and operation and large capacity, and which is so constructed as to be readily dumped or reset after dumping.

It is a particular object of the present invention to provide a derrick fork with an improved latching device and a guard or casing for the same, and to provide a simple and substantial means for jointing the tines of the fork with a bail.

The invention consists of the parts and the construction and combination of parts as hereinafter more fully described and claimed, having reference to the accompanying drawings, in which—

Figure 1 is a view of the hay fork looking toward the tines. Fig. 2 is an edge or side view of the hay fork. Fig. 3 is a detail vertical sectional view of the latch and latch box. Fig. 4 is a transverse sectional view through the same.

My fork consists of a plurality of tines 2 bent into parallelism from their respective bodies or shank portions 3, which are shown in Fig. 1 as angularly converging from the roots or bases of the tines 2 toward a central bracket or box structure 4. The box structure 4 consists of a front having upper and lower parallel plates 5 and 6 and a lower forward angular extension 7. The upper ends of the shanks 3 are formed with eyes 8 arranged within the box structure 4 and held therein by means of bolts 8′, one for each of the eyes 8, which are passed through a socket or back plate 10 adjustable against the rear of the box structure 4 to cover the eyes 8 of the tine shanks. The lower portions of the shanks 3 are braced and rigidly connected by an angle-iron cross-bar 9 with suitable clips 9′. The tines, with their connection at 4 and by bar 9, constitute a rigid unitary fork structure of great strength and rigidity.

13 is a bail on which the bar 9 hinges to allow the fork proper to dump, as later explained, and 14 is a latch to lock the bail and fork together. The pivotal means for the fork consists of eye bolts 15 secured to the bar 9 and engaged by the inwardly turned ends 17 of the bail 13. When the bail 13 and the shanks 3 are parallel, as when the fork is in operative position, the bight or connection 19, at the apex of the upwardly converging reins of the bail, is adapted to ride over the spring-pressed snap latch 14 carried by box 4 at the united upper ends of the shanks 3; the latch being pivoted at 20 and supported upon the top plate 5 and acted on by the spring 21. The upper end of the bail 13 is provided with an eye 24, in which is hung a link 25, whereby the hay fork may be readily attached to any lifting or haul tackle as desired. For the convenience of the manipulation of the hay fork by an operator, a handle 26 is shown as attached to the bar 9 adjacent to its central portion.

In loading operation the bail 13 is interlocked with the tine structure by the automatic snap latch 14 so as to hold the fork in carrying position. After being loaded and lifted by the lift tackle or haul ropes, the operator from a convenient station trips the fork by a pull on a rope 22 attached to the latch 14, thereby releasing the latch and allowing the fork to dump; the fork turning on the inwardly turned ends 17 of the bail 13 as fulcra.

Having thus described my invention, what I claim and desire to secure by Letters Patent is—

1. In a hay fork, a central bracket having a front plate, upper and lower plates which project rearwardly from the front plate, the lower plate being extended downwardly and then rearwardly to lie in substantial parallelism with the upper and lower plates, tines having eyes which are received between the upper and lower plates and extend to the rear of the front plate, a back plate which abuts the rear ends of the eyes and engages said extension of the lower plate, bolts passed through the front and rear plates and through the eyes, a latch pivoted to the top plate, a coil spring inclosed by the back plate and seating on said rear extension of the lower plate and bearing against the latch, and means for pivotally supporting the tines engageable with said latch.

2. In a hay fork, a central bracket having a front plate, upper and lower plates which project rearwardly from the front plate, the lower plate being extended downwardly and then rearwardly to lie in substantial parallelism with the upper and lower plate, tines having eyes which are received between the upper and lower plates and extend to the rear of the front plate, a back plate which abuts the rear ends of the eyes and engages said extension of the lower plate, means passed through the front and rear plates and through the eyes to secure said parts together, said upper plate having an aperture, a latch having a part extended through said aperture and having the end portion of said part disposed in parallelism with the upper plate, a coil spring seated on said rear extension of the lower plate and abutting the latch, and means for pivotally supporting the tines engageable with said latch.

In testimony whereof I have hereunto set my hand in the presence of two subscribing witnesses.

JOHN HOLST.

Witnesses:
A. J. ELLEN,
H. G. HILL.

Copies of this patent may be obtained for five cents each, by addressing the "Commissioner of Patents, Washington, D. C."